(12) United States Patent
Campbell

(10) Patent No.: US 6,270,094 B1
(45) Date of Patent: Aug. 7, 2001

(54) MULTI-PURPOSE WIRE DISPENSING CART

(76) Inventor: William F. Campbell, 4003 Charles St., Rockford, IL (US) 61108-6135

( * ) Notice: Subject to any disclaimer, the term of this patent is extended or adjusted under 35 U.S.C. 154(b) by 0 days.

(21) Appl. No.: 09/277,111

(22) Filed: Mar. 26, 1999

(51) Int. Cl.⁷ .................................................. B65H 16/02
(52) U.S. Cl. ................................. 280/47.19; 280/47.35; 280/79.3; 280/47.34; 242/594.4
(58) Field of Search .............................. 280/47.19, 79.11, 280/79.3, 47.35, 47.34, 47.28, 79.7, 79.6; 242/557, 594.4; 211/60.1, 144, 131.1; 248/283.1, 285.1

(56) References Cited

U.S. PATENT DOCUMENTS

| | | |
|---|---|---|
| 875,476 | 12/1907 | Wasson . |
| 1,660,521 | 2/1928 | Nordgren . |
| 2,155,769 | 4/1939 | Porter . |
| 2,705,114 | 3/1955 | Worsham . |
| 3,212,645 * | 10/1965 | Walden, Sr. .......................... 211/60.1 |
| 3,610,431 * | 10/1971 | Rodden .............................. 211/60.1 |
| 3,759,538 * | 9/1973 | Fabiano .............................. 280/47.35 |
| 3,870,177 | 3/1975 | Cobb . |
| 4,179,080 | 12/1979 | Patnaude . |
| 4,391,422 | 7/1983 | McDonald . |
| 4,457,527 | 7/1984 | Lowery . |
| 4,530,472 | 7/1985 | Voss et al. . |
| 4,564,152 | 1/1986 | Herriage . |
| 4,585,130 | 4/1986 | Brennan . |
| 4,605,237 | 8/1986 | Torgrimson . |
| 4,611,645 | 9/1986 | Whisnant . |
| 4,901,937 | 2/1990 | Mendoza . |
| 5,123,666 | 6/1992 | Moore . |
| 5,188,308 * | 2/1993 | Tussing ................................ 242/557 |
| 5,285,981 * | 2/1994 | Pavelka ............................... 242/557 |
| 5,308,012 | 5/1994 | Fuller . |
| 5,316,232 * | 5/1994 | Lambert, Jr. ......................... 242/557 |
| 5,362,078 | 11/1994 | Paton . |
| 5,390,943 | 2/1995 | Hedrick . |
| 5,495,951 * | 3/1996 | Biasini ............................... 280/79.3 |
| 5,509,671 | 4/1996 | Campbell . |
| 5,595,395 | 1/1997 | Wilson . |
| 5,615,902 | 4/1997 | Beurich . |
| 5,687,928 | 11/1997 | Lassiter . |
| 5,871,219 * | 2/1999 | Elliott ................................ 280/79.3 |
| 5,915,646 * | 6/1999 | Campbell ........................... 280/47.17 |
| 6,116,533 * | 9/2000 | Elder ................................. 280/47.35 |

FOREIGN PATENT DOCUMENTS 1114180   5/1968   (EP) .

* cited by examiner

Primary Examiner—Michael Mar
Assistant Examiner—Hau Phan
(74) Attorney, Agent, or Firm—Marshall, O'Toole, Gerstein, Murray & Borun

(57) ABSTRACT

A wire dispensing utility cart adapted to carry wire spools for dispensing wire during installation. The present invention provides a relatively large utility cart for carrying multiple and large spools of wire in a mobile fashion for dispensing wire during the installation of electrical wiring into buildings, structures, aircraft, and the like. The cart is mobile and relatively compact to facilitate movement of the cart through standard sized doorways and elevator bays, and is sufficiently large to accommodate a large number of wire spools. In addition, the cart provides at least two elongated storage bays to facilitate transportation of relatively large objects such as ladders, conduits, and other materials and supplies needed for the installation process.

17 Claims, 4 Drawing Sheets

MULTI-PURPOSE WIRE DISPENSING CART

FIELD OF THE INVENTION

The present invention generally relates to construction tools, and more particularly relates to tools to facilitate installation of electrical wiring within buildings and other structures.

BACKGROUND OF THE INVENTION

The installation of electrical wiring into buildings, machines and other large structures, such as aircraft and ocean liners, is often a time-consuming and cumbersome one. Using the installation of electrical wiring into a home or office building as an example, the electrician often needs to pull wire through walls, conduits, and openings in floors and stud work for a considerable distance to connect various power supplies to various switches and mechanisms.

Such wire is commonly obtained from the manufacturer in a wound package without a central spool and the electrician is required to pull the wire from the package, typically a cardboard box with a perforated opening provided therein. Since the cardboard box does not have an axis around which the wire can rotate as it is being pulled, and the wire is typically pulled from the inner diameter of the package, the box is often pulled with the wire, and the wire often becomes tangled or coiled as it is dispensed. If the wire is provided on a spool, the electrician is required to fabricate some sort of axle about which the spool can rotate for the wire to be dispensed. Since the wire is not only pulled a great distance, but also at various angles, the process often becomes cumbersome and time-consuming.

Augmenting these difficulties is the fact that, often, the electrician is required to pull more than one wire at a time through the same conduit or structure. These wires may be of different size, and provided on different diameter spools, effecting the rate at which the wire is dispensed. Moreover, a tangle in one particular wire will prevent successful dispensing of all of the wires until that one particular tangle is resolved. In the case of buildings or similar structures, multiple wires on the order of six to twelve or more different strands may be pulled at the same time, whereas with aircraft and ocean liners, wire bundles having individual strands in excess of forty to sixty strands is not uncommon.

My previous invention, as embodied in U.S. Pat. No. 5,509,671 (the '671 patent), therefore discloses a cart for carrying spools of wire which enabled multiple spools of wire to be maintained and transported on a single, easily movable cart. The cart includes a wheeled frame somewhat resembling that of a conventional cargo dolly with a plurality of racks removably attached to the front of the frame and providing mandrels about which the spools can rotate. Multiple wires can therefore be pulled from the cart embodied in my previous '671 patent. Moreover, since the spools are kept in relatively close proximity, even though multiple wires may be pulled at the same time, the wires are removed at the relatively same rate of speed.

Sometimes, it is advantageous to provide additional tools and accessories for use in conjunction with the wire installation process. For example, it would be advantageous to provide various hand tools and devices such as fasteners and junction boxes, and the like, along with the wire provided directly on the cart. Therefore, as disclosed in another of my previous inventions, U.S. patent application Ser. No. 09/172,829, now allowed, I disclose a cart for carrying spools of wire and utility trays which in addition to carrying the aforementioned wire spools, also provides multiple gravity leveling trays on the cart for holding and transporting such devices and tools.

With all of this being said, a still further need exists in the industry for a cart adapted to hold spools even larger than those carried by my aforementioned patented structures as well as in greater quantities, to carry additional relatively small hand tools and fasteners, and in addition, to carry relatively large materials such as, ladders, and lengths of conduit through which the wiring is often pulled. While it would be advantageous to provide a cart from which relatively large wire spools can be dispersed, it would at the same time be advantageous to be able to dispense wire from relatively small spools from the same cart. However, the wire must be situated on the cart such that the wire will be dispensed at the relatively same rate of speed and provided on a mobile cart sufficiently sized to be easily transported about various work sites.

SUMMARY OF THE INVENTION

It is therefore an objective of the present invention to provide a cart for carrying spools of wire and multiple tools and supplies for construction purposes such as ladders, and elongated conduits.

It is another objective of the present invention to provide a cart for dispensing electrical wiring which enables multiple spools and variously sized spools to be dispensed at the same time.

In accordance with these objectives, it is a feature of a preferred embodiment of the present invention to provide a utility cart for dispensing wire having a mobile frame with upper and lower levels defining a vertical axis, and first and second ends defining a longitudinal axis. The cart further includes retaining brackets removably mounted between the upper and lower levels along the vertical axis and a plurality of mandrels extending from the retaining brackets along a lateral axis. The plurality of mandrels are spaced to receive wire spools thereon and dispense wire spools therefrom along the longitudinal axis of the cart.

Another feature of a preferred embodiment of the present invention is to provide such a wire dispensing utility cart with a plurality of casters to facilitate movement.

It is another feature of a preferred embodiment of the present invention to provide such a wire dispensing utility cart dimensioned to fit through a standard width doorway and into a standard size elevator bay.

It is still another feature of a preferred embodiment of the present invention to provide a wire dispensing utility cart manufactured from a plurality of channel tubes either welded or bolted together and adapted to receive anchors along the entire length of each channel to facilitate customization.

It is yet another feature of a preferred embodiment of the present invention to provide such a wire dispensing utility cart having first and second vertical beam members connecting the upper level to the lower level at the first and second ends of the frame, with first and second cross beams connecting the first and second vertical beams at the upper and lower levels. In this embodiment, the retaining brackets are removably attached to the first and second cross beams.

It is a still further feature of a preferred embodiment of the present invention to provide such a wire dispensing utility cart wherein the retaining brackets include a first runner bolted to the first cross beam and a second runner bolted to a second cross beam, with plurality of vertical arms extending between the first and second runners and a plurality of mandrels extending from the plurality of vertical arms. The first and second runners include a plurality of spaced apertures at which the plurality of vertical arms are adapted to be secured to accommodate variously sized wire spools.

These and other objectives and features of the invention will become more apparent from the following detailed description when taken in conjunction with the accompanying drawings.

Figure 1:
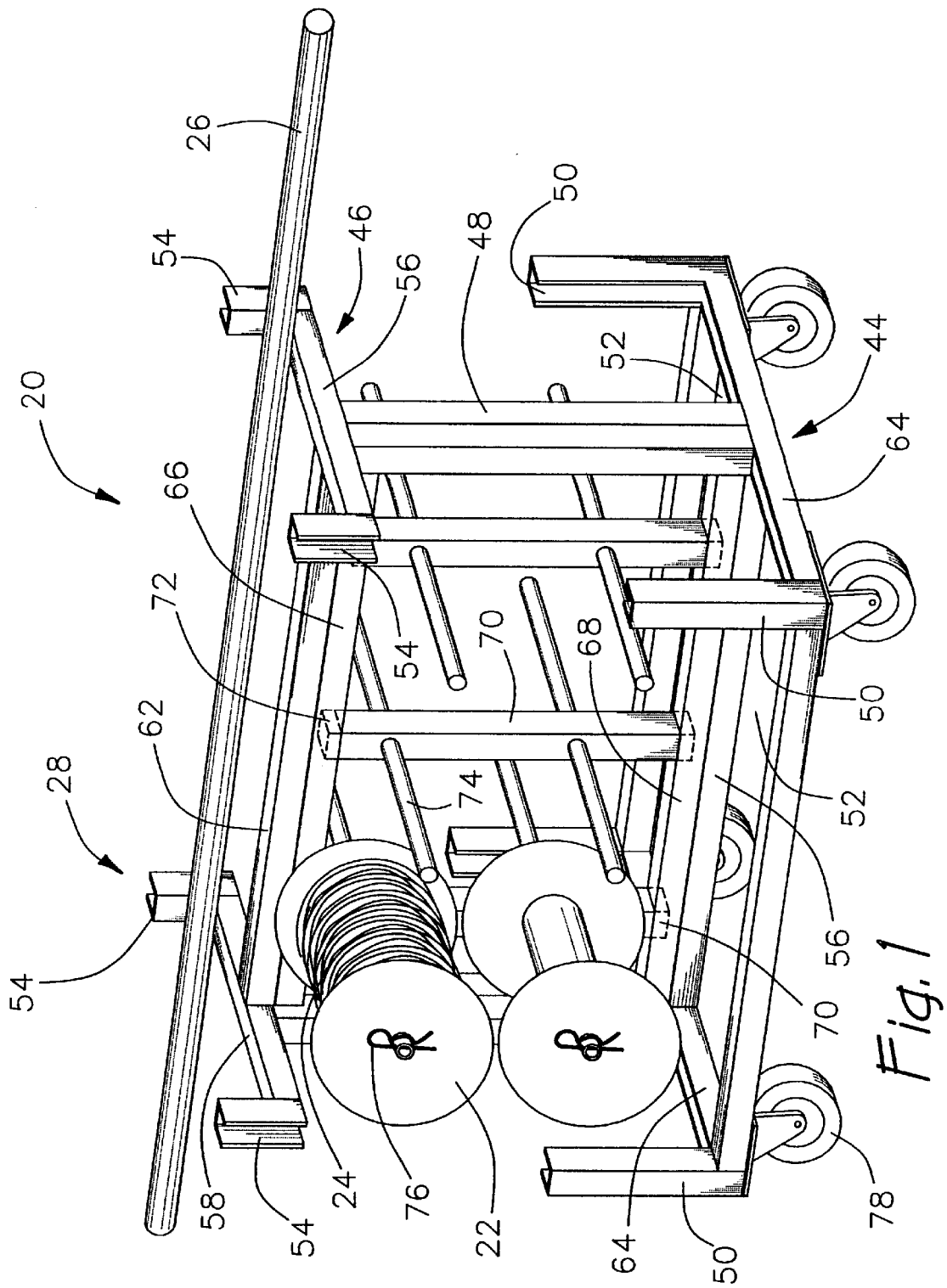
FIG. 1 is a perspective view of a preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
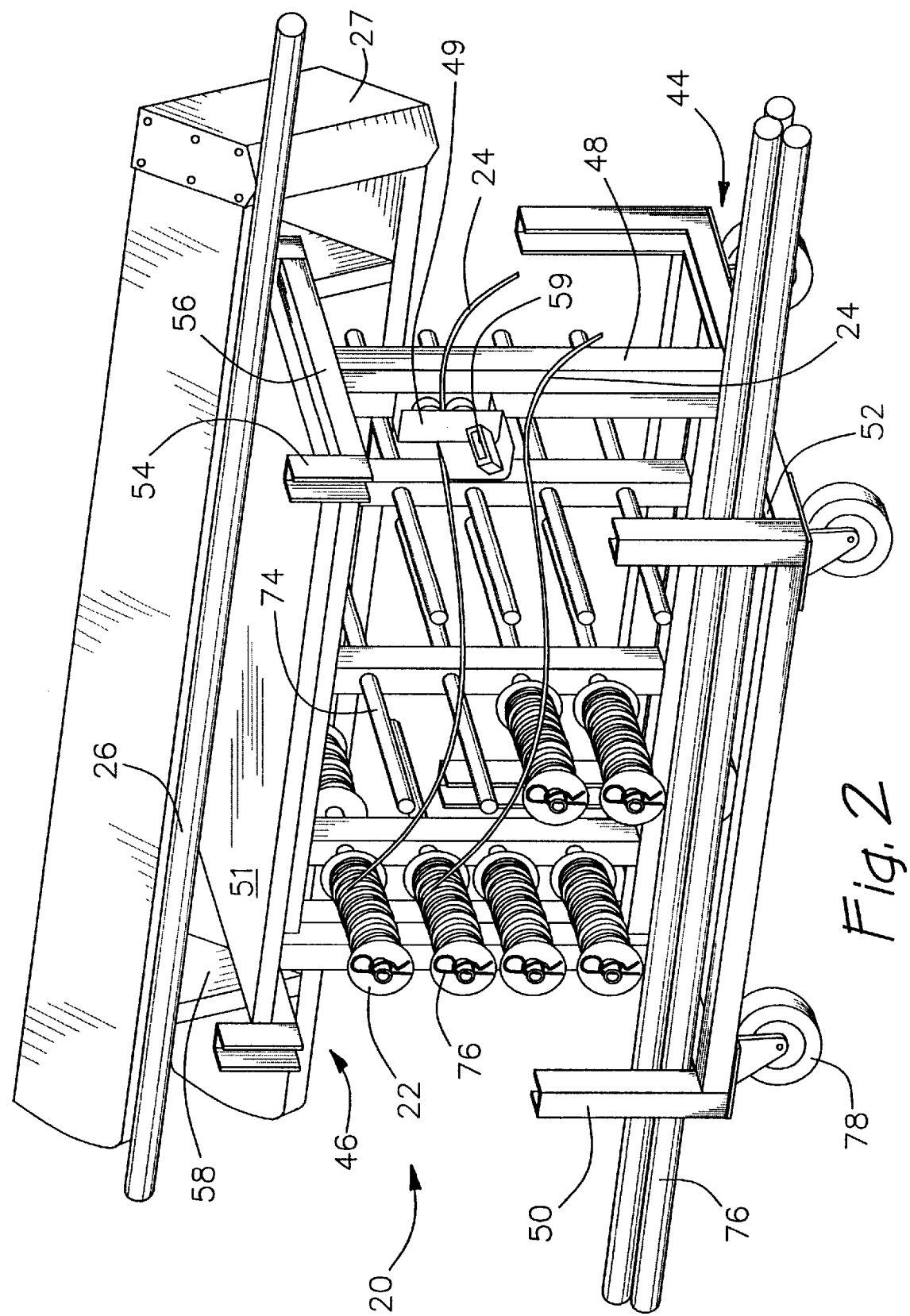
FIG. 2 is a perspective view of another preferred embodiment of the present invention showing a different number of wire spools mounted onto the invention.

Referring now to the drawings and with specific reference to FIGS. 1 and 2, the preferred embodiment of the present invention is depicted as cart 20. While not part of the present invention, the figures do depict a number of the materials which can potentially be carried upon cart 20, such as spools 22 carrying wire 24, conduits 26, and ladder 27. It is to be understood that the present invention, while not depicted, is also adapted to carry a number of other similarly sized or shaped objects such as beams, boxes of supplies or the like commonly used during construction.

Figure 3:
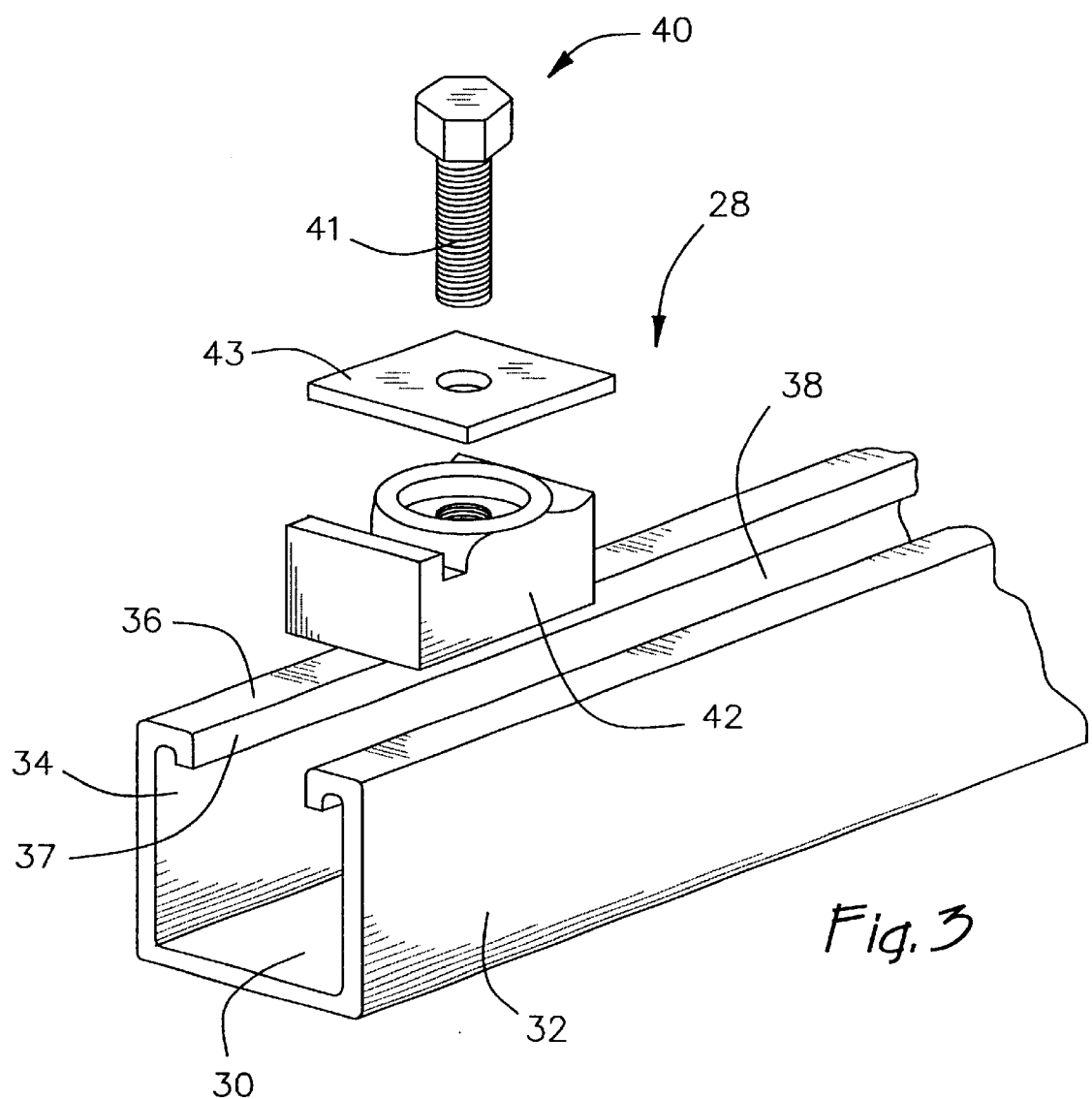
FIG. 3 is a perspective view of a u-shaped beam and fastener assembly.

The preferred embodiment of cart 20 is manufactured from a plurality of u-shaped channel beams welded together at all junctions. Alternatively, u-shaped beams 28 could be bolted or otherwise mechanically connected to facilitate the deconstruction and assembly of cart 20 for purposes of shipping, storage, and customization. As shown in more detail in FIG. 3, each u-shaped beam 28 includes base 30, first side 32, second side 34, return 36 and ledge 37. Each u-shaped beam 28 therefore provides a channel 38 which can be used to secure fastener 40 thereto in that each fastener 40 includes a flange portion 42 sufficiently narrow to be inserted into channel 38 past ledge 36, and upon ninety degrees of rotation, engage the other side of each ledge 36 to prevent removal by being secured with bolt 41 and washer 43.

Returning again with reference to FIG. 1, cart 20 is shown having lower level 44 as well as upper level 46 connected by vertical beams 48. More specifically, lower level 44 includes, in the preferred embodiment, four sides with a retention leg 50 provided in each corner. In so doing, and in cooperation with vertical beams 48, it can be seen by one of ordinary skill in the art that first and second storage bays 52 are formed to allow elongated materials to be stored and transported thereon.

Upper level 46 is similar to lower level 44 in that four retention legs 54 are provided. In addition, it can be seen that first and second lateral beams 56 extend from vertical beams 48 to complete the storage bay 58 provided at the upper level. Vertical beams 48 also in a preferred embodiment, provide a mounting surface for wire counter 49 having meter 59. In addition, it is to be understood that planar materials such as shelf 51 can be used to span across the entire storage bay 58, such as through the use of an appropriately sized piece of plywood, to provide a base to bay 58 to prevent passage of materials therethrough. Such a surface would also provide a suitable surface to which various accessories and tools such as vises, pipe-fitters, and wire drawers, and the like, can be mounted.

For purposes of rigidity, and providing a surface against which mounting arms 70 can be mounted, the frame of cart 20 is completed by cross beams 62. More specifically, upper cross beam 62 extends between the vertical beams 48 proximate lateral beams 56, while lower cross beam 62 extends between vertical beams 48 proximate frame sides 64. In so doing, it can be seen by one of ordinary skill in the art that the cart 20 of a preferred embodiment of the present invention extends in a longitudinal direction as defined by cross beams 62, in a vertical direction defined by vertical beams 48, and in a lateral direction defined by lateral beams 56 and frame sides 64.

As alluded to earlier, cross beams 62 provide at least two purposes with the preferred embodiment of the present invention. One purpose provided by cross beams 62 manifests itself in the form of a surface to which runners 66 and 68 can be attached. In the preferred embodiment of the present invention, upper and lower runners 66 and 68 are mounted to cross beams 62 by a bolt or other similar fasteners, but in alternative embodiments, they could be welded or otherwise permanently affixed to cross beams 62.

Spanning between upper runner 66 and lower runner 68, a plurality of mounting arms 70 extend along the vertical plane. As shown in both FIGS. 1 and 2, mounting arms 70 can be provided at various spaced distances to facilitate storage of multiple spools 22, with as many as seventy two spools being provided on each side of mounting arms 70. To enable mounting arms 70 to be connected between upper runner 66 and lower runner 68, it can be seen from FIGS. 1 and 2 that each runner includes a plurality of apertures 72 through which the ends of mounting arms 70 can be extended. In other words, by inserting one end of mounting arm 70 into one aperture on either of the upper or lower runner, the mounting arm 70 can be inserted to a sufficient degree to allow the opposite end to have sufficient clearance to be placed directly over a corresponding aperture in the opposite runner. The mounting arm 70 will eventually rest upon the base of lower runner 68 and be held via gravity, and in a vertical position by upper and lower runners 66 and 68.

Figure 4:
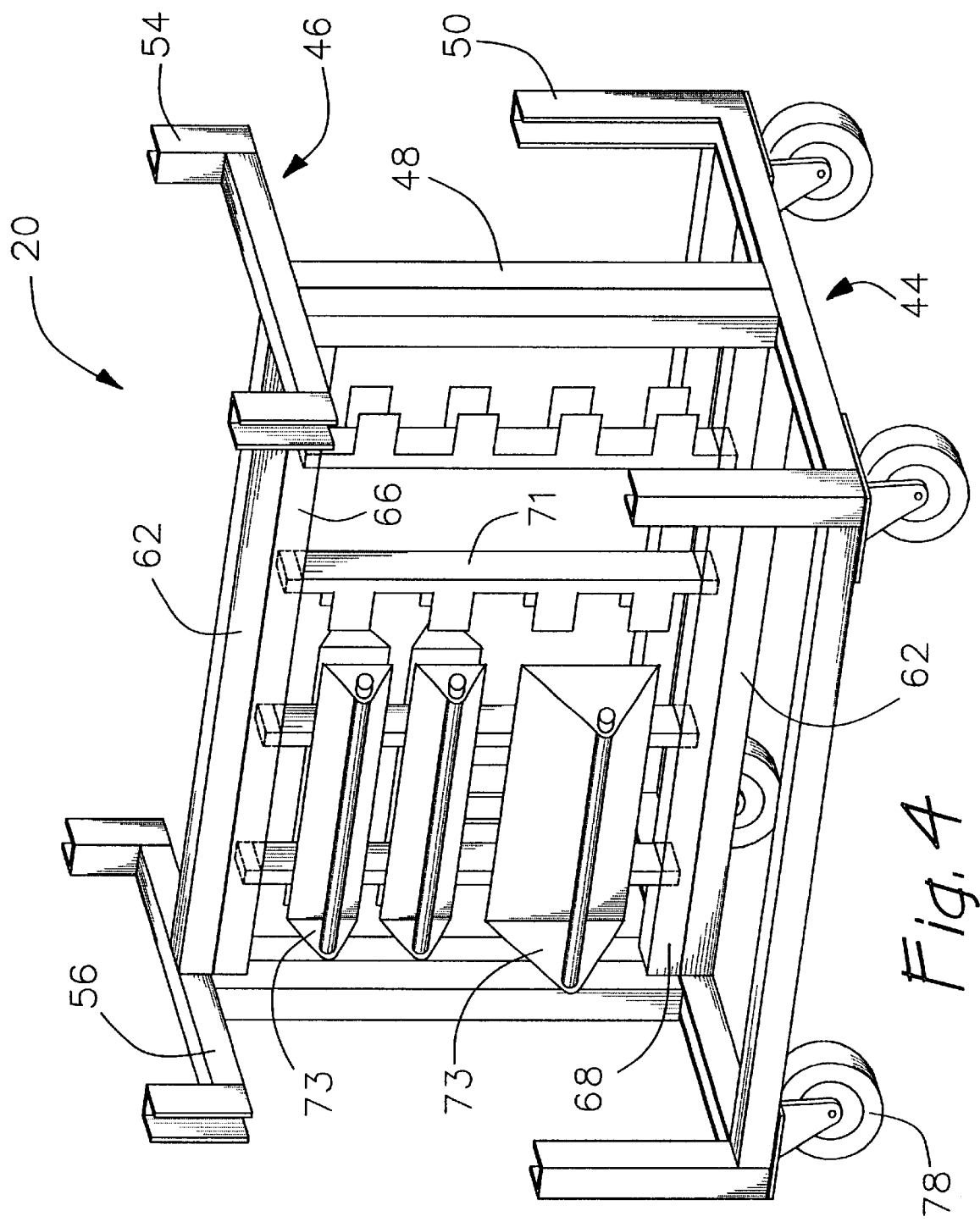
FIG. 4 is a perspective view of another preferred embodiment showing a prior art rack mounted to the present invention.

In an alternative embodiment shown in FIG. 4, mounting arms 70 can be removed and replaced with rails 71 having extensions 90 to which spool supporting racks 73 of various sizes can be attached as disclosed in my previous U.S. Pat. No. 5,509,671. The present invention is therefore completely compatible with my prior inventions.

Extending from each mounting arm 70 are spool mandrels 74. As can be seen from FIGS. 1 and 2, mandrels 74 extend from mounting arms 70 in both lateral directions and provide an axis about which spools 22 can rotate. In the preferred embodiment of the present invention each spool 22 is secured to mandrels 74 via a suitable hitch pin 76. In addition, it is to be understood that as shown in FIG. 2, multiple spools 22 can be mounted onto the same mandrel 74. While not depicted in the figures, I have found that the standard size cart 20 of my invention can accommodate at least 144 spools 22.

To prevent rotation of mounting arms 70, and thereby maintain the appropriate position of spools 22, it can be seen that mounting arms 70 are provided in a square cross-sectional configuration with apertures 72 being congruently shaped. By preventing mounting arms 70 from rotating, it ensures that wire 24 will be pulled in the longitudinal direction only and not in the lateral direction. This is of importance in that by ensuring the wire is pulled in the longitudinal direction, the distance between the spools is kept at a minimum and the wire is dispensed at a relatively even rate of speed. Conversely, if the wire were to be dispensed across the lateral direction of cart 20, spools on the outer edges of the frame would be dispensing much more wire than those in the middle and wire is likely to be pulled over the end disks of the spools. This can result in inaccurate, cumbersome, and time-consuming installation. This is not to be confused with the sample whereby previous pack is hung from cart 20. In that embodiment, wire can be pulled in a lateral direction because the width of the pack itself is relatively narrow.

The present invention not only allows for multiple spools to be transported upon cart 20, but as shown in FIGS. 1 and 2, each cart 20 includes, in the preferred embodiment, casters 78 which facilitate this mobility. In the preferred embodiment of the present invention, at least two of the casters 78 are provided with locking mechanisms to prevent rotation of the caster wheels, and thus movement of the cart 20, and each caster 78 is a swivel caster to allow for ease of steering and mobility. In alternative embodiments, differing configurations of casters can be used.

The preferred embodiment of the present invention has also been dimensioned to facilitate movement of cart 20 about various construction sites, including through standard sized doorways and into standard sized elevator bays. In other words, the cart 20 of the preferred embodiment can fit through a standard sized door width of thirty inches and height of seventy-eight inches, and into a standard elevator bay having a depth of fifty-one inches, and a width of sixty-eight inches. While these dimensions should not serve as a limiting factor of the present invention it is to be understood that it is an objective of a preferred embodiment of the present invention to keep the dimensions of cart 20 relatively small to facilitate such movement around construction work sites, while still being of sufficient size to carry a relatively large number of spools indicated above in the dispensing position, and the elongated materials and building tools indicated as well.

From the foregoing, it can therefore been seen that the present invention provides a new and improved wire dispensing utility cart having the ability to dispense wire from at least one hundred twenty separately mounted wire spools. In addition, the cart is adapted to carry elongated materials and building supplies such as ladders and conduits along with the wire to facilitate the installation and construction process.

What is claimed is:

1. A wire dispensing utility cart, comprising:
    a mobile frame having upper and lower storage bays defining a vertical axis, and first and second ends defining a longitudinal axis, the upper and lower storage bays having, corners, being u-shaped, and including a retention leg at each corner of the bay, the mobile frame further including vertical beams at first and second ends of the cart, and a longitudinal cross beam connecting the vertical beams;
    mounting arms removably mounted between the upper and lower storage bays along the vertical axis, each of the upper and lower storage bays including a plurality of apertures adapted to receive upper and lower ends of the mounting arms, each of the mounting arms being mounted in one of the apertures in the upper storage level and in one of the apertures in the lower storage level without any external fasteners; and
    a plurality of mandrels extending from the mounting arms, the plurality of mandrels being spaced to receive wire spools thereon and dispense wire along the longitudinal axis of the cart.

2. The wire dispensing utility cart of claim 1 wherein the mobile frame includes a plurality of casters to facilitate movement.

3. The wire dispensing utility cart of claim 1 wherein the cart is dimensioned to fit through a standard width doorway and into a standard size elevator bay.

4. The wire dispensing utility cart of claim 1 wherein the frame is manufactured from a plurality of channel tubes welded and bolted together, each channel tube being adapted to receive anchors along the entire length of each channel tube.

5. The wire dispensing utility cart of claim 1 wherein the lower level is wider than the upper level and each level includes channel tubes extending along the vertical axis to serve as positive stops for cargo loaded on to the upper and lower levels.

6. The wire dispensing utility cart of claim 1 wherein the frame further includes first and second vertical beam members connecting the upper level to the lower level at the first and second ends of the frame, and first and second cross beams connecting the first and second vertical beams at the upper and lower levels, the mounting arms being removably attached to the first and second cross beams.

7. The wire dispensing utility cart of claim 6 wherein the retaining brackets include a first runner attached to the first cross beam, a second runner attached to the second cross beam, and a plurality of vertical arms extending between the first and second runners, the plurality of mandrels extending from the plurality of vertical arms.

8. The wire dispensing utility cart of claim 7 wherein the first and second runners include a plurality of spaced apertures at which the plurality of vertical arms are adapted to be secured to accommodate variously sized wire spools.

9. The wire dispensing utility cart of claim 7 wherein the plurality of vertical arms include mandrels spaced along a range of distances to accommodate a range of spool diameters and number of spools.

10. The wire dispensing utility cart of claim 8 wherein the plurality of apertures are rectangular and the plurality of vertical arms are rectangular in cross-section.

11. The wire dispensing utility cart of claim 1 wherein the mobile frame includes four pivot casters, at least two of which include means for locking rotation.

12. The wire dispensing utility cart of claim 1 wherein each of the mandrels extends strictly horizontally from one of the mounting arms.

13. The wire dispensing utility cart of claim 12, wherein each of the upper and lower storage bays is adapted to carry cargo associated with dispensing wire, the cargo carried by the storage bays not affecting wire spool carrying capacity of the cart.

14. A method of dispensing wire from a utility cart having upper and lower storage levels, each of the storage levels having corners, being u-shaped, and including a retention leg at each corner, the utility cart further including vertical beams at first and second ends of the cart, and a longitudinal cross beam connecting the vertical beams, the method including the steps of:

inserting mounting rails between the upper and lower storage levels, each of the mounting rails having a plurality of mandrels extending strictly horizontally therefrom, each mandrel having a longitudinal axis;

mounting at least two spools of wire onto at least one of the mandrels, the spools each including a central rotational axis, the rotational axes of the spools being coincident with the longitudinal axis of the mandrels; and pulling wire from the spools along the longitudinal axis of the cart, the spools rotating independently during the pulling step.

15. The method of claim 14 wherein the inserting step is performed without any separate fasteners.

16. The method claim 15 wherein the upper and lower storage levels include slots adapted to receive first and second ends of the mounting rails, the mounting rails being held in a vertical position when received in the first and second slots.

17. A wire dispensing utility cart, comprising:

a mobile frame having upper and lower storage levels, each of the upper and lower storage levels having corners, being u-shaped, and including a retention leg at each corner, the mobile frame further including vertical beams at first and second ends of the frame, and a longitudinal cross beam connecting the vertical beams;

mounting rails removably mounted between the upper and lower levels; and a plurality of removable spool supporting racks mounted to the rails;

wherein the mounting rails include rails with mandrel receiving apertures at differing spacing to thereby accommodate wire spools of differing diameters;

wherein the mounting rails are removably mounted between the upper and lower storage levels without fasteners;

wherein each of the spool supporting racks include a frame attachable to the mounting rails and a mandrel mounted to the frame and adapted to support a wire spool.

* * * * *